(12) United States Patent
Lin et al.

(10) Patent No.: US 8,009,770 B2
(45) Date of Patent: Aug. 30, 2011

(54) DECODER FOR 4QAM-NR AND METHOD THEREOF

(75) Inventors: Shih-Hsun Lin, Taipei County (TW); Kin-Ming So, Yuen Long (HK)

(73) Assignee: Princeton Technology Corporation, Taipei County (TW)

( * ) Notice: Subject to any disclaimer, the term of this patent is extended or adjusted under 35 U.S.C. 154(b) by 851 days.

(21) Appl. No.: 12/007,762

(22) Filed: Jan. 15, 2008

(65) Prior Publication Data

US 2008/0310551 A1    Dec. 18, 2008

(30) Foreign Application Priority Data

Jun. 12, 2007   (TW) ............................. 96121150 A

(51) Int. Cl.
*H04L 27/06* (2006.01)

(52) U.S. Cl. ........................................ 375/340; 375/316

(58) Field of Classification Search .................. 375/316, 375/340, 341, 262, 265
See application file for complete search history.

(56) References Cited

U.S. PATENT DOCUMENTS

| | | | |
|---|---|---|---|
| 2002/0122657 A1* | 9/2002 | Moon et al. ..................... | 386/94 |
| 2002/0172395 A1* | 11/2002 | Foote et al. .................... | 382/100 |
| 2004/0098567 A1* | 5/2004 | Hansen et al. ................. | 712/223 |
| 2007/0260842 A1* | 11/2007 | Faibish et al. ................. | 711/170 |

* cited by examiner

*Primary Examiner* — Emmanuel Bayard
(74) *Attorney, Agent, or Firm* — Muncy, Geissler, Olds & Lowe, PLLC

(57) ABSTRACT

A 4QAM-NR decoder and decoding method are disclosed. The 4QAM-NR decoder, obtains original data corresponding to receiving data received by a receiving terminal. The 4QAM-NR decoder comprises a determining device, an improving device and a corresponding device. The determining device provides a determining method to determine whether the receiving data is improved or not. The improving device improves the receiving data. The corresponding device obtains the approximate original data corresponding to the receiving data.

18 Claims, 4 Drawing Sheets

DECODER FOR 4QAM-NR AND METHOD THEREOF

BACKGROUND OF THE INVENTION

1. Field of the Invention

The present invention relates to decoders for 4QAM-NR and methods thereof, and in particular relates to decoders for 4QAM-NR with data interfered during transmission in a DMB-TH system.

2. Description of the Related Art

During data transmission with wireless technology, the data are encoded at a transmission terminal to avoid interference during the transmission process and data loss. However, should interferences occur during data transmission, after receiving the data by a receiving terminal, the receiving data would be rendered useless because of destruction of the data due to the interference.

In a DMB-TH system, the encoding methods are divided into 64QAM, 32QAM, 16QAM, 4QAM and 4QAM-NR according to characteristics of the data encoded at the transmission terminal. The 4QAM-NR encoding method at the transmission terminal released by the official transmission protocol is shown in FIG. 1. Presently, there is a need for developing a decoding method for 4QAM-NR.

Referring to FIG. 1, it shows the encoding method for 4QAM-NR in a DMB-TH system. An original data comprises 8 bits as X0~X7, and the 8 bits are mapped to be 16 bits by a NR mapping, the mapping data are Y0~Y7. As shown in FIG. 1, the 8-bit original data 11 (X0X1 . . . X7) are calculated according to mapping formula 12 at the transmission terminal (not shown), and the 8-bit original data 11 becomes 16-bit mapping data 13 (X0X1 . . . X7Y0Y1 . . . Y7; NR-code). Then, the data is transmitted by the form of mapping data 13 till mapping data 13 is received by the receiving terminal (not shown). Decoding operation is performed on mapping data 13 to recover the original data 11 for usage.

However, during data transmission with wireless technology, mapping data 13 may be interfered with during transmission, and the content of mapping data 13 may be changed from the original mapping data 13 due to the interferences. In this situation, the changed mapping data 13 will not be able to find the corresponding original data 11 via the mapping table of original data 11 and mapping data 13. Here, the changed mapping data 13 will require sorting and comparing to approximate the original data.

Because mapping data 13 have 16 bits, 65536 operations are required for priority sorting, thus, placing a heavy load on hardware requirement. Therefore, an important issue is to develop a method for decoding interfered and encoded 4QAM-NR data at a receiving terminal.

BRIEF SUMMARY OF INVENTION

A detailed description is given in the following embodiments with reference to the accompanying drawings.

A 4QAM-NR decoding method is disclosed. The 4QAM-NR decoding method obtains mapping data corresponding to receiving data received by a receiving terminal and original data corresponding to the mapping data, wherein the receiving data comprises an original part and a mapping part. The 4QAM-NR decoding method comprises processing one of the original part and the mapping part by a predetermined method and classifying the receiving data into a first receiving data and a second receiving data according to the processing result, improving the second receiving data by an improving method to increase accuracy of the second receiving data, and obtaining the mapping data corresponding to the receiving data and the original data corresponding to the mapping data according to the processing result and the improving result.

A 4QAM-NR decoding method is disclosed. The 4QAM-NR decoding method obtains mapping data corresponding to receiving data received by a receiving terminal and obtains original data corresponding to the mapping data, wherein the receiving data comprises an original part and a mapping part. The 4QAM-NR decoding method comprises providing a determining method to classify the receiving data into a plurality of types, determining the types of the receiving data to determine whether improving is performed, determining the types of the receiving data and selecting one of a plurality of improving methods to improve the receiving data, and determining the mapping data corresponding to the receiving data and the original data corresponding to the mapping data.

A 4QAM-NR decoder is disclosed. The 4QAM-NR decoder obtains mapping data corresponding to receiving data received by a receiving terminal and obtains original data corresponding to the mapping data, wherein the receiving data comprises an original part and a mapping part. The 4QAM-NR decoder comprises a determining device, an improving device and a corresponding device. The determining device is configured to provide a determining method to classify the receiving data into a plurality of types and determine whether the receiving data has improved or not. The improving device is configured to improve the receiving data. The corresponding device is configured to obtain the mapping data corresponding to the receiving data and obtain the original data according to the corresponding mapping data.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
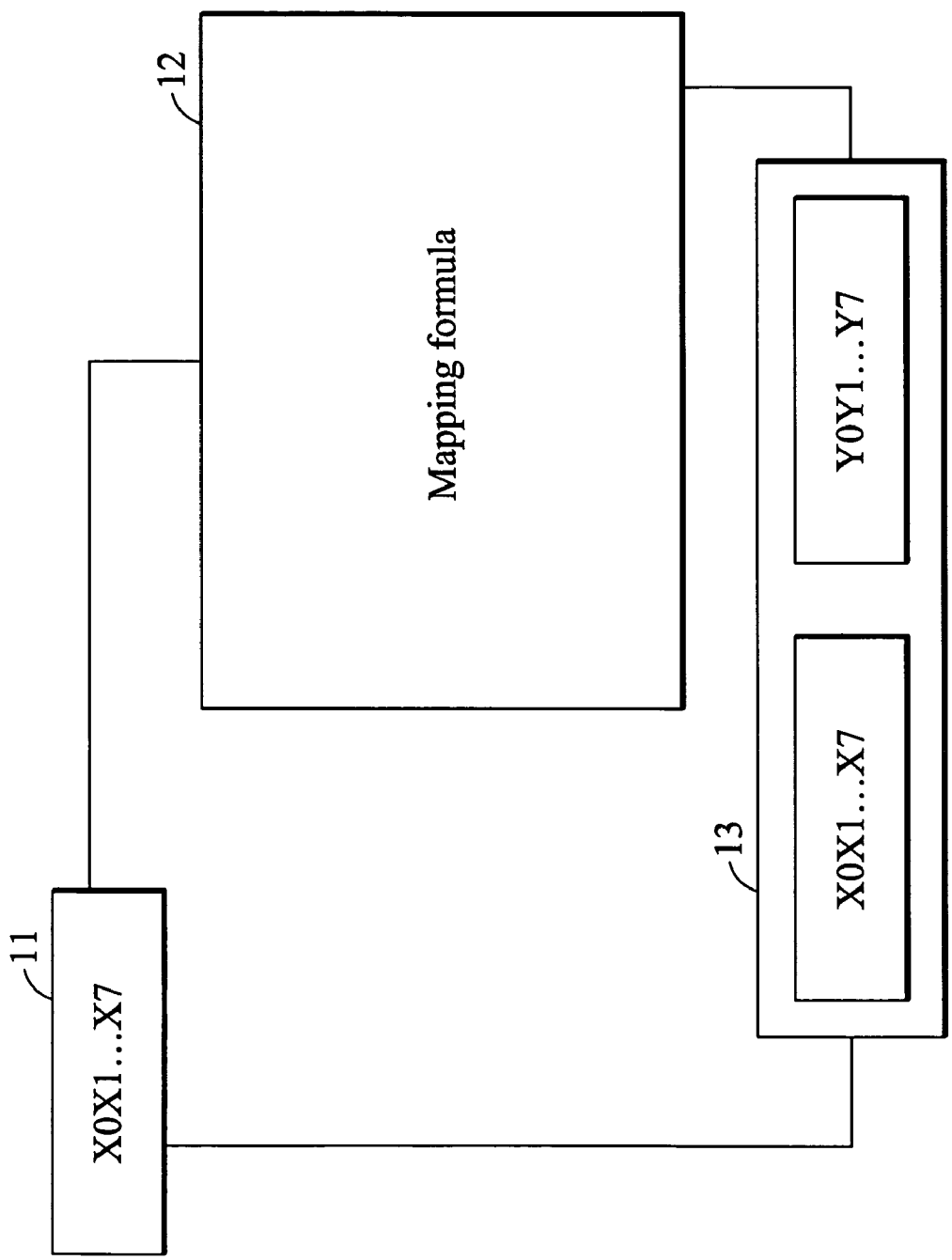
FIG. 1 is a diagram illustrating the 4QAM-NR encoding method in a DMB-TH system.
Figure 2:
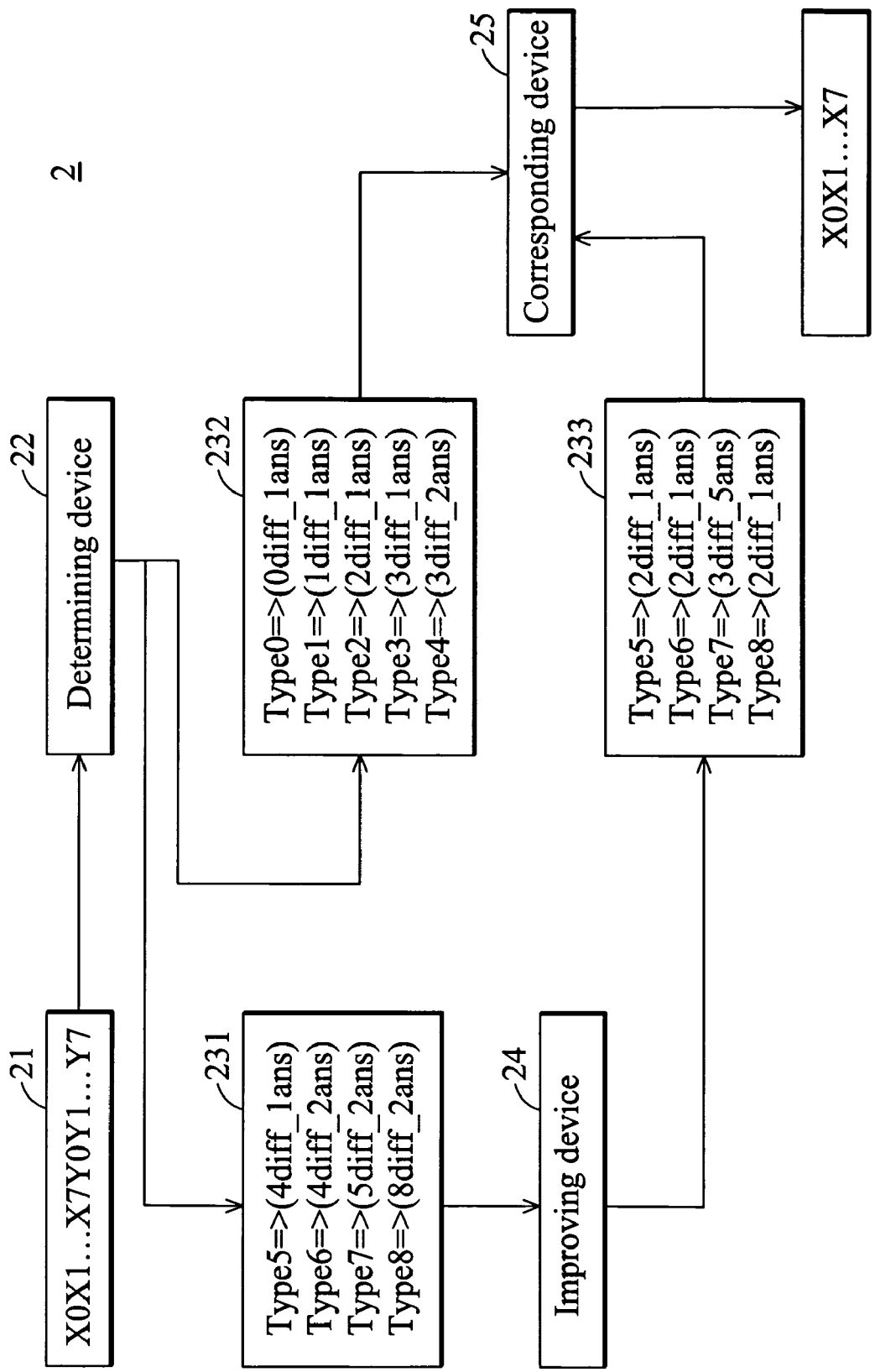
FIG. 2 is a diagram illustrating the 4QAM-NR decoder in an embodiment of the invention.
Figure 3:
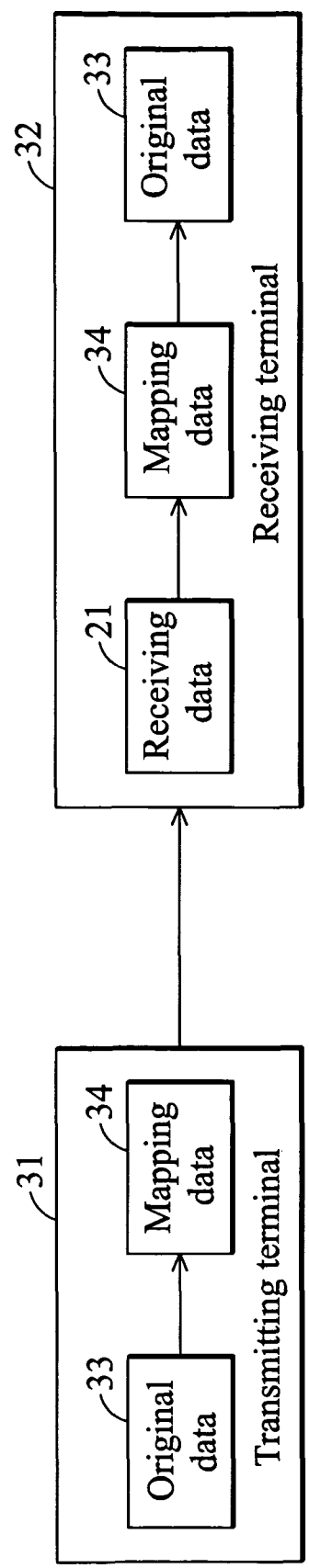
FIG. 3 is a diagram illustrating the data transmission in an embodiment of the invention.

Referring to FIG. 2, FIG. 2 is a diagram illustrating the 4QAM-NR decoder disclosed in the embodiment of the invention. As shown in FIG. 2, 4QAM-NR decoder 2 comprises a receiving data 21, a determining device 22, an improving device 24 and a corresponding device 25. Referring to FIG. 3, FIG. 3 is a diagram illustrating the data transmission in the embodiment of the invention. As shown in FIG. 3, receiving data 21 is mapping data 34 received at receiving terminal 32. As mapping data 34 may be interfered with during the process of transmission from transmission terminal 31 to receiving terminal 32, receiving data 21 received by receiving terminal 32 may be different from mapping data 34, wherein receiving data 21 and mapping data 34 are both 16-bit data divided into an original part and a mapping part. The original part is 8-bit original data 33, and the mapping part is 8-bit encoding data generated from original data 33 by NR mapping. Original data 33 becomes mapping data 34 after NR mapping and encoding. Mapping data 34 is transmitted from transmission terminal 31 to receiving terminal 32, at which time mapping data 34 may be interfered with during the transmission. Then, the interfered mapping data 34 is received by receiving terminal 32 and becomes receiving data 21. The 4QAM-NR decoder disclosed in FIG. 3 is for decoding the interfered receiving data 21 to be mapping data 34, and then mapping data 34 is decoded to be original data 33 for usage.

Referring to FIG. 2, determining device 22 is configured to receive receiving data 21 and perform a determining method for receiving data 21. The determining method comprises using a table (not shown) recording mapping data 34 and the corresponding original data 33, and comparing the original part or the mapping part of receiving data 21 with mapping data in the mapping table to obtain at least one corresponding mapping data 34 for receiving data 21. According to the number of the corresponding mapping data 34 and different bits between receiving data 21 and the corresponding mapping data 34, receiving data 21 is classified into nine Type0~Type8. Receiving data 21 is classified as Type0 when only one corresponding mapping data 34 is obtained and no different bits exists, in another word, receiving data 21 is not interfered with. Meanwhile, receiving data 21 is classified as Type1 when only one corresponding mapping data 34 is obtained and one different bit exists, receiving data 21 is classified as Type2 when only one corresponding mapping data 34 is obtained and two different bits exist, receiving data 21 is classified as Type3 when one corresponding mapping data 34 is obtained and three different bits exist, receiving data 21 is classified as Type4 when two corresponding mapping data 34 are obtained and three different bits exist, receiving data 21 is classified as Type5 when only one corresponding mapping data 34 is obtained and four different bits exist, receiving data 21 is classified as Type6 when two corresponding mapping data 34 are obtained and four different bits exist, receiving data 21 is classified as Type7 when two corresponding mapping data 34 are obtained and five different bits exist, and receiving data 21 is classified as Type8 when two corresponding mapping data 34 are obtained and eight different bits exist. Wherein, receiving data classified as Type0~3 corresponds to only one mapping data 34, and the different bits are under 3 bits. Thus, the corresponding mapping data 34 is determined to be the solution and receiving data classified as Type4 corresponds to two mapping data 34. As there are both three different bits between the corresponding mapping data and receiving data and receiving data 21 cannot approximate the mapping data 34 by improving any of the two corresponding mapping data 34 may be selected to be the solution of the receiving data classified as Type4. Accordingly, no improving operation is performed for receiving data classified as Type0~4, wherein receiving data classified as Type0~4 belongs to receiving data 232 without improving.

Next, improving device 24 is configured to improve receiving data 231 which requires improving. Receiving data 231 requiring improving comprises receiving data classified as Type5~8. The improving method comprises a first improving method, a second improving method and a third improving method. The first improving method is for receiving data classified as Type5 and Type6. In receiving data 21, the original part and the mapping part each comprises 8 bits. One of the original part and the mapping part is used to compare with mapping data 34 when determining device 22 performs the determining. The first improving method is to compare receiving data 21 with mapping data 34 according to the mapping table after adjusting one bit of the original part or the mapping part. For example, receiving data 21 is [00000100 00100000], in which 00000100 is the original part, and 00100000 is the mapping part, and the original part is selected for performing the improving operation. First, the original part is adjusted to be 10000100 which makes receiving data become [10000100 00100000]. Then, the corresponding mapping data 34 is obtained according the mapping table. Next, another bit of the original part is further adjusted to make receiving data 21 become [01000100 00100000], and the corresponding mapping data 34 is obtained according to the mapping table. The adjusting and mapping steps are repeated till each bit of the original part has been adjusted and the corresponding mapping data 34 has been obtained to obtain the number of the corresponding mapping data and the different bits. The same method may be used for adjusting the mapping part, but it is not limited to the disclosed embodiments.

Via the first improving method, receiving data classified as Type5 may be improved to have only one corresponding mapping data 34 and two different bits from one corresponding mapping data 34 and four different bits. Meanwhile, receiving data classified as Type6 may be improved to have only one corresponding mapping data 34 and two different bits from two corresponding mapping data 34 and four different bits. In addition, the corresponding mapping data is the solution.

Next, the second improving method is adapted to receiving data classified as Type7. Receiving data classified as Type7 corresponds to two mapping data 34 according to the determining method and five different bits exist. Specifically, receiving data classified as Type7 has merely 3 different bits and five corresponding mapping data 34 according to statistics. Wherein, the three different bits are separated into the original part and the mapping part. One of the original part and the mapping part comprises two different bits, and the other comprises one different bit. The original part and the mapping part comprises three different bits. According to the statistics, receiving data classified as Type7 may be improved to correspond to five mapping data, but only three different bits exist. Wherein, the accuracy of each corresponding mapping data is the same, and any of the five corresponding mapping data may be consequently selected to be the solution.

Next, the third improving method is adapted to receiving data classified as Type8. Receiving data classified as Type8 corresponds to two mapping data 34 according to the determining method and eight different bits exist. Only the last bit of the original part and the mapping part may have been interfered with. In another word, receiving data classified as Type8 may be improved to correspond to only one mapping data and only two different bits exist, and the corresponding mapping data is the solution.

Improving data 233 is obtained after improving receiving data 231. Corresponding device 25 is configured to receive receiving data 232 without improving and improving data 233, obtain corresponding mapping data 34 by the mapping table, and obtain original data 33. Finally, the decoding operation of 4QAM-NR is completed.

Figure 4:
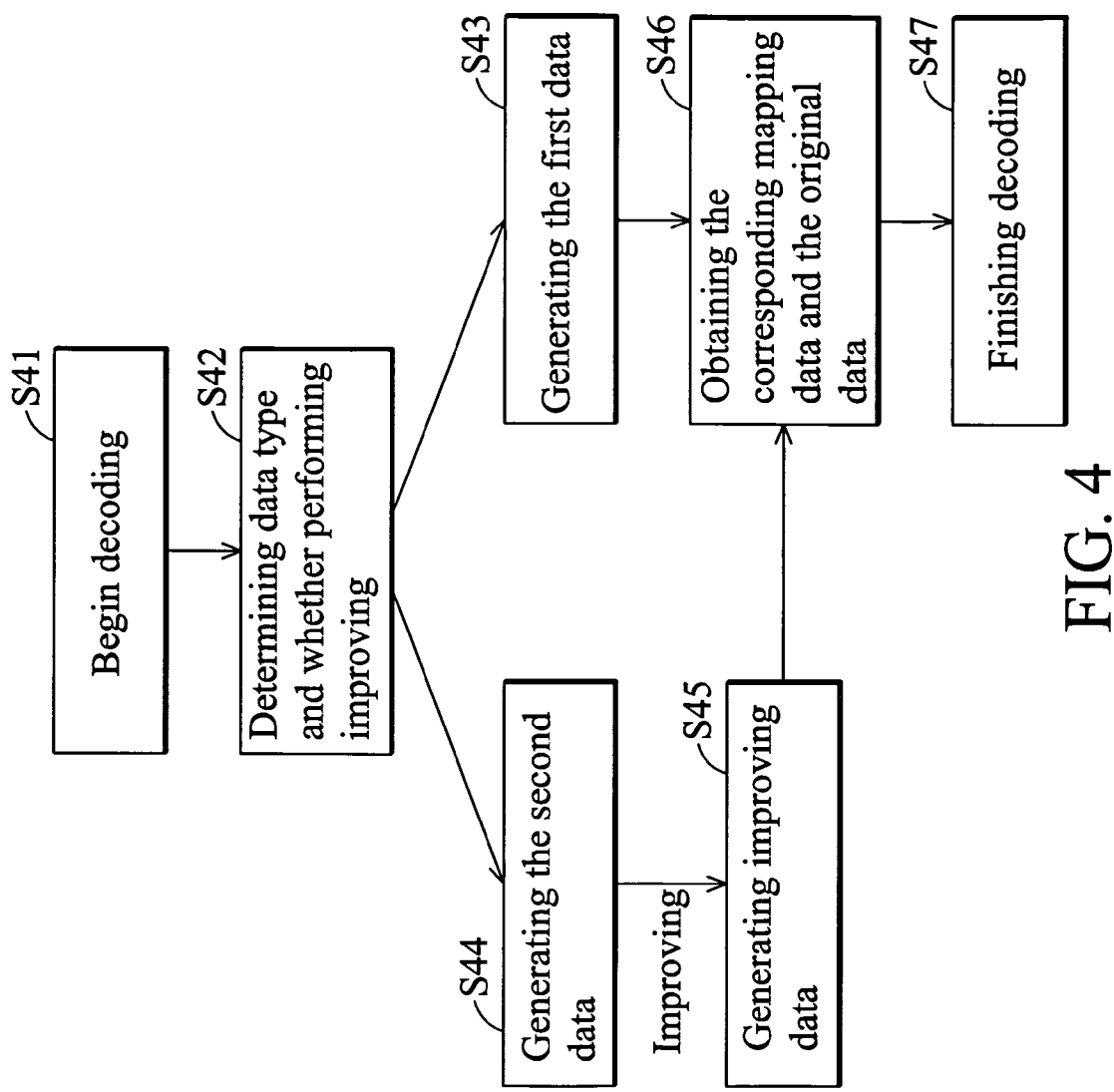
FIG. 4 is a flowchart illustrating the 4QAM-NR decoding method in an embodiment of the invention.

Referring to FIG. 4, FIG. 4 is flowchart illustrating the 4QAM-NR decoding method in the embodiment of the invention. As shown in FIG. 4, after starting decoding (S41), receiving data 21 is determined by a predetermined method and is classified into a plurality of types. Whether receiving data 21 is improved according to the types is determined (S42). A first receiving data is generated without improving (S43). A second receiving data is generated when improving is required (S44). The improving data is generated by improving the second receiving data according to the types of the receiving data and the improving methods shown in FIG. 3 (S45). The corresponding original data is obtained by the corresponding mapping data of receiving data 21 obtained by comparing the first data and the improving data according to the mapping table (S46). Finally, the process of decoding is completed (S47).

Accordingly, different improving methods are performed to approach the mapping data and the original data according to the types of the receiving data in the embodiment of the invention. The disclosed 4QAM-NR decoder and decoding methods efficiently save a plurality of operations used for comparing priorities of different corresponding mapping data in conventional methods. Not only does the operation efficiently save time, but also the hardware costs and the hardware area occupied in an IC are saved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 4QAM-NR decoding method for obtaining mapping data corresponding to a receiving data received by a receiving terminal and obtaining an original data corresponding to the mapping data, wherein the receiving data comprises an original part and a mapping part, comprising:
   processing one of the original part and the mapping part by a predetermined method and classifying the receiving data into a first receiving data and a second receiving data according to a processing result by a determining device;
   improving the second receiving data by an improving device to provide an improving method to increase accuracy of the second receiving data; and
   obtaining the mapping data corresponding to the receiving data and the original data corresponding to the mapping data according to the processing result and the improving result by a corresponding device.

2. The 4QAM-NR decoding method as claimed in claim 1, wherein the original data comprises 8 bits and becomes the mapping data by calculating via an encoding formula, the mapping data comprises 16 bits and becomes the receiving data received by the receiving terminal via transmission, and the receiving data comprises 16 bits.

3. The 4QAM-NR decoding method as claimed in claim 1, wherein the predetermined method is a table mapping method, and the table mapping method is used for obtaining all the mapping data corresponding to one of the original part and the mapping part.

4. The 4QAM-NR decoding method as claimed in claim 3, wherein the first receiving data is the receiving data where the number of the corresponding mapping data cannot be decreased by the improving method after processing one of the original part and the mapping part by the table mapping method, and the second receiving data is the receiving data where the number of the corresponding mapping data can be decreased by the improving method after processing one of the original part and the mapping part by the table mapping method.

5. The 4QAM-NR decoding method as claimed in claim 1, wherein the receiving data is classified into nine types, wherein five of the types belong to the first receiving data, and the other four of the types belong to the second receiving data.

6. The 4QAM-NR decoding method as claimed in claim 1, wherein the improving method comprises:
   adjusting one bit of one of the original part and the mapping part of the receiving data;
   obtaining the corresponding mapping data by a table mapping method with the adjusted receiving data; and
   repeating adjusting different bits till the number of the corresponding mapping data obtained is limited.

7. A 4QAM-NR decoding method for obtaining mapping data corresponding to a receiving data received by a receiving terminal and obtaining an original data corresponding to the mapping data, wherein the receiving data comprises an original part and a mapping part, comprising:
   providing a determining device to classify the receiving data into a plurality of types and determine which types of the receiving data are improved according to the types of the receiving data;
   selecting one of a plurality of improving methods from an improving device to improve the receiving data according to the types of the receiving data; and
   determining the mapping data corresponding to the receiving data, and the original data corresponding to the mapping data by a corresponding device.

8. The 4QAM-NR decoding method as claimed in claim 7, wherein the original data comprises 8 bits and becomes the mapping data by calculating via an encoding formula, the mapping data comprises 16 bits and becomes the receiving data received by the receiving terminal by transmission, and the receiving data comprises 16 bits.

9. The 4QAM-NR decoding method as claimed in claim 7, wherein a providing step of the determining device comprises:
   obtaining a number of the mapping data corresponding to the receiving data and an error bits portion by performing a table mapping method with the receiving data; and
   determining the types of the receiving data according to the number of the number of the corresponding mapping data and the error bits portion.

10. The 4QAM-NR decoding method as claimed in claim 7, wherein the receiving data is classified into nine types, which are Type0~Type8.

11. The 4QAM-NR decoding method as claimed in claim 10, wherein the improving method is not performed for the receiving data classified as Type0~Type4.

12. The 4QAM-NR decoding method as claimed in claim 11, wherein the improving method comprises:
   a first improving method adapted to the receiving data classified as Type5 and Type6;
   a second improving method adapted to the receiving data classified as Type 7; and
   a third improving method adapted to the receiving data classified as Type 8.

13. A 4QAM-NR decoder for obtaining mapping data corresponding to a receiving data received by a receiving terminal and obtaining an original data corresponding to the mapping data, wherein the receiving data comprises an original part and a mapping part, comprising:
   a determining device configured to provide a determining method to classify the receiving data into a plurality of types and determine whether the receiving data is improved or not;
   an improving device configured to improve the receiving data; and a corresponding device configured to obtain the mapping data corresponding to the receiving data and obtain the original data according to the corresponding mapping data.

14. The 4QAM-NR decoder as claimed in claim 13, wherein the original data comprises 8 bits and becomes the mapping data by calculating via an encoding formula, the mapping data comprises 16 bits and becomes the receiving data received by the receiving terminal by transmission, and the receiving data comprises 16 bits.

15. The 4QAM-NR decoder as claimed in claim 13, wherein the determining method comprises:
   obtaining a number of the mapping data corresponding to the receiving data and an error bits portion by performing a table mapping method with the receiving data; and
   determining the types of the receiving data according to the number of the number of the corresponding mapping data and the error bits portion.

16. The 4QAM-NR decoder as claimed in claim 13, wherein the receiving data is classified into nine types, which are Type0~Type8.

17. The 4QAM-NR decoding method as claimed in claim 16, wherein the improving method is not performed for the receiving data classified as Type0~Type4.

18. The 4QAM-NR decoder as claimed in claim 17, wherein the improving method comprises:
   a first improving method adapted to the receiving data classified as Type5 and Type6;
   a second improving method adapted to the receiving data classified as Type 7; and
   a third improving method adapted to the receiving data classified as Type 8.

* * * * *